United States Patent [19]

Sagawa et al.

[11] Patent Number: 5,223,562
[45] Date of Patent: Jun. 29, 1993

[54] THERMOSETTING POWDER COATING MATERIAL

[75] Inventors: Chiaki Sagawa, Tokyo; Manabu Katagiri, Yokohama; Toru Kurashina, Petaling Jaya Selangor Darul Ehsan, all of Japan

[73] Assignee: NOF Corporation, Tokyo, Japan

[21] Appl. No.: 959,579

[22] Filed: Oct. 13, 1992

[30] Foreign Application Priority Data

Oct. 11, 1991 [JP] Japan .................. 3-292367
Aug. 10, 1992 [JP] Japan .................. 4-234191

[51] Int. Cl.$^5$ .............. C08L 91/06; C08L 91/00
[52] U.S. Cl. .................. 524/275; 524/277; 524/487; 524/488; 524/489; 524/763; 524/904
[58] Field of Search ........... 524/275, 276, 277, 478, 524/479, 480, 487, 488, 489, 763, 520, 544, 545, 546, 904

[56] References Cited

U.S. PATENT DOCUMENTS 4,065,419 12/1977 Kawaguchi et al. ............ 524/275
5,130,365 7/1992 Koishi et al. .................. 524/520

FOREIGN PATENT DOCUMENTS 0219372 12/1984 Japan .................. 524/544
0243378 10/1988 Japan .................. 524/277

Primary Examiner—Thurman K. Page
Assistant Examiner—Peter Szekely
Attorney, Agent, or Firm—Millen, White, Zelano & Branigan

[57] ABSTRACT

A thermosetting powder coating composition comprises (a) a fluororesin having reactive group for crosslinking in the molecule which contains 10 weight % or more of fluorine and has glass transition temperature in the range from 35° to 120° C., (b) a hardener which can form crosslinking by reaction with the reactive group for crosslinking in the fluororesin (a) and (c) a synthetic wax or a natural wax. The amount of the fluororesin is in the range from 60 to 97 weight % and the amount of the hardener is in the range from 3 to 40 weight % based on the total of the fluororesin and the hardener. The amount of the synthetic wax or the natural wax is in the range from 0.01 to 10 weight parts based on 100 weight parts of the total of the fluororesin and the hardener. The coating layer formed from the thermosetting fluororesin powder coating composition has the same degree of water repellency and slipping property to those of the coating layer formed from polytetrafluoroethylene powder while the excellent weatherability, acid resistance and adhesion to substrates are retained.

14 Claims, No Drawings

THERMOSETTING POWDER COATING MATERIAL

BACKGROUND OF THE INVENTION

1. Field of the Invention

The present invention relates to a novel thermosetting powder coating material having improved slipping property and water repellency of coating by compounding synthetic wax or natural wax to a fluororesin powder coating material having reactive group for crosslinking in the molecule.

2. Description of the Prior Art

Application of thermoplastic fluororesin powders comprising tetrafluoroethylene resins to various areas has been proposed and practical applications have been made to adhesion-free applications such as coating of frying pans and rice cookers by taking advantage of the low surface tension of fluororesins (Laid Open Japanese Patent Applications Showa 61-181567, Showa 61-151571 and Showa 61-181572).

However, the applications described above have problems that melt coating of the resin requires a high temperature of around 400° C. and that adhesion to substrates is not satisfactory.

A thermosetting fluororesin powder coating material was developed for solving these problems (Laid Open Japanese Patent Application Heisei 1-103670).

This thermosetting fluororesin powder coating material can form the coating layer by baking at a temperature of 200° C. or lower and the coating has good weatherability and acid resistance as well as good adhesion to substrates. This material has been widely used for these reasons. However, this material has a problem that water repellency and slipping property which are advantages of fluororesins in general are remarkably inferior because it contains less amount of fluorine than conventional fluororesin powders containing tetrafluoroethylene resins.

SUMMARY OF THE INVENTION

The present invention accordingly has an object to provide a thermosetting fluororesin powder coating composition which can form coating layer under the baking condition of 200° C. or lower, has excellent weatherability, acid resistance and adhesion to substrates and has the same degree of water repellency and slipping property to those of thermoplastic fluororesin powders.

Extensive investigations undertaken by the present inventors with the objects described above lead to a discovery that the water repellency and the slipping property can be remarkably improved without having adverse effect on the weatherability, the acid resistance and the adhesive property by compounding (c) a synthetic wax or a natural wax to a resin composition comprising (a) a specific fluororesin having reactive group for crosslinking in the molecule and (b) a hardener. The present invention has been completed on the basis of the discovery.

Thus, the thermosetting powder coating composition of the invention comprises (a) a fluororesin having reactive group for crosslinking in the molecule which contains 10 weight % or more of fluorine and has glass transition temperature in the range from 35° to 120° C., (b) a hardener which can form crosslinking by reaction with the reactive group for crosslinking in the fluororesin (a) and (c) a synthetic wax or a natural wax. The amount of the fluororesin is in the range from 60 to 97 weight % based on the total of the fluororesin and the hardener and the amount of the hardener is in the range from 3 to 40 weight % based on the total of the fluororesin and the hardener. The amount of the synthetic wax or the natural wax is in the range from 0.01 to 10 weight parts based on 100 weight parts of the total of the fluororesin and the hardener.

Other and further objects, features and advantages of the invention will appear more fully from the following description.

DETAILED DESCRIPTION OF THE INVENTION

The synthetic wax or the natural wax (c), which will be occasionally referred to as the wax, utilized in the invention preferably has a melting point in the range from 50° to 280° C. Natural waxes, such as plant waxes, animal waxes and mineral waxes, or synthetic waxes may be utilized as the wax of the invention. When the melting point of the wax utilized in the invention is lower than 50° C., powder particles tend to coalesce during the application process for the powder coating and, when the melting point is higher than 280° C., the powder coating composition does not melt during the period for the formation of the coating layer, resulting in insufficient water repellency and slipping property of the formed coating layer.

The wax (c) preferably has a melting point suitable for melting during the formation of the coating layer. Because the temperature of the formation of the coating layer is different according to application, it is more preferable that the melting point of the wax is lower than the temperature of the formation of coating layer by 10° to 20° C. For example, when the coating layer is formed by baking at 180° C., the melting point of the wax is more preferably in the range from 160° to 170° C.

Form of the wax (c) utilized in the invention is not particularly limited so long as the wax can be dispersed and mixed homogeneously during the preparation process of the powder coating material. Waxes of solid bulk form, flake form, powder form and other forms may be utilized.

Examples of the natural wax are montan wax, carnauba wax, beeswax, shellac wax, paraffin wax, ceresine, Japan wax and the like. Examples of the synthetic wax are reaction products of long chain alcohols having 16 to 36 carbon atoms, such as cetyl alcohol, palmityl alcohol, stearyl alcohol and the like, with acids, such as stearic acid, palmitic acid, myristic acid and the like, glycerides of fatty acids, such as stearic acid and the like, ester of glycols, polyethylene glycols and the like with fatty acids, such as stearic acid and the like, synthetic beeswaxes, such as aliphatic amine waxes obtained by the reaction of hydrogenated caster oil and monoethanolamine, high molecular weight aliphatic amides and the like, and the like synthetic waxes.

Preferable examples of the wax (c) in the invention are unsubstituted polyolefin wax, polyamide wax, fluoropolyolefin wax, aliphatic ester wax and beeswax. The more preferable example among them is unsubstituted polyolefin wax.

The fluororesin comprising reactive group for crosslinking (a) in the invention contains 10 weight % or more of fluorine and has a glass transition temperature in the range from 35° to 125° C.

The fluororesin (a) comprises fluoroolefin units and units having the reactive group for crosslinking. Examples of the fluoroolefin unit are units derived from fluoroolefins, such as tetrafluoroethylene, chlorotrifluoroethylene, trifluoroethylene, vinylidene fluoride, hexafluoropropylene, pentafluoropropylene and the like. The kind of the fluoroolefin unit can be suitably selected according to the properties required for the coating layer, the other components in the copolymer used in combination and the hardener used in combination. Either a single kind of the fluoroolefin unit or a combination of two or more kinds of the fluoroolefin units may be utilized.

The reactive group for crosslinking in the molecule of the fluororesin is hydroxyl group, carboxyl group, glycidyl group, amide group, amino group, mercapto group, isocyanate group or an active halogen atom, such as bromine and iodine and preferably hydroxyl group, carboxyl group or glycidyl group.

The reactive group for crosslinking can be introduced into the fluororesin by the method of copolymerization of a fluoroolefin and a monomer having the reactive group for crosslinking, by the method of copolymerization of a fluoroolefin and a monomer having a substituent forming the reactive group for crosslinking by decomposition, followed by partial decomposition of the copolymer thus prepared and by the method of copolymerization of a fluoroolefin and a monomer having a functional group which is reactive with a compound giving the reactive group for crosslinking, followed by the reaction of the copolymer thus prepared with the compound giving the reactive group for crosslinking.

As the monomer having hydroxyl group for crosslinking, a monomer having hydroxyl group or a group which can be converted into hydroxyl group and a double bond copolymerizable with the fluoroolefins described above can be utilized. Examples of such a monomer having hydroxyl group for crosslinking are: hydroxyalkyl vinyl ethers, such as hydroxyethyl vinyl ether, hydroxypropyl vinyl ether, hydroxybutyl vinyl ether, hydroxyisobutyl vinyl ether, hydroxycyclohexyl vinyl ether and the like; esters of hydroxyalkyl carboxylic acids and vinyl alcohol, such as vinyl hydroxyacetate, vinyl hydroxypropionate, vinyl hydroxylactate, vinyl hydroxyvalerate, vinyl hydroxyisolactate, vinyl hydroxycyclohexanecarboxylate and the like; hydroxyalkyl allyl ethers, such as hydroxyethyl allyl ether, hydroxypropyl allyl ether, hydroxybutyl allyl ether, hydroxyisobutyl allyl ether, hydroxycyclohexyl allyl ether and the like; hydroxyalkyl allyl esters, such as hydroxyethyl allyl ester, hydroxypropyl allyl ester, hydroxybutyl allyl ester, hydroxyisobutyl allyl ester, hydroxycyclohexyl allyl ester and the like; hydroxyalkyl esters of acrylic acid and methacrylic acid, such as 2-hydroxyethyl acrylate, hydroxypropyl acrylate, 2-hydroxyethyl methacrylate, hydroxypropyl methacrylate and the like; partially fluorinated compounds of the above compounds; and the like compounds.

The monomer having hydroxyl group or a group which can be converted into hydroxyl group and a double bond copolymerizable with the fluoroolefins may be utilized singly or as a combination of two or more kinds. Vinyl compounds and allyl compounds are preferable among the examples described above because of copolymerization reactivity with the fluoroolefins.

Examples of the monomer having carboxyl group are (meth)acrylic acid, carboxylalkyl allyl ether and the like.

Examples of the monomer having glycidyl group are glycidyl (meth)acrylate, glycidyl vinyl ether, glycidyl allyl ether and the like.

As an example of the method utilizing the partial decomposition of copolymer, a monomer having an ester group which can be decomposed after the copolymerization is copolymerized with the fluoroolefin and carboxyl group is formed in the copolymer by hydrolysis of the ester group after the copolymerization.

When the copolymer having ester group is utilized, the copolymer may be utilized directly for curing without the hydrolysis and crosslinked by transesterification.

The fluororesin having reactive group for crosslinking (a) comprised in the thermosetting powder coating composition of the invention contains 10 weight % or more of fluorine.

The content of fluorine is generally directly related to the composition of the fluoroolefin unit in the fluororesin having the reactive group for crosslinking (a). However, the content of fluorine can also be varied by polymer reactions after the copolymer has been prepared.

When the content of fluorine in the fluororesin having reactive group for crosslinking (a) is less than 10 weight %, the coating layer having sufficient weatherability cannot be prepared.

The content of fluorine in the fluororesin having reactive group for crosslinking (a) is preferably in the range from 10 to 72 weight %.

The fluororesin having reactive group for crosslinking (a) comprised in the thermosetting powder coating composition of the invention has the reactive group for crosslinking and a coating layer having excellent toughness and adhesion can be prepared by the reaction of the reactive group for crosslinking with the hardener. Average molecular weight of the molecular chain of the fluororesin (a) per one reactive group for crosslinking is preferably in the range from 250 to 25,000. When the average molecular weight of the molecular chain per one reactive group for crosslinking is more than 25,000, the crosslinking is insufficient to cause decrease of the properties like solvent resistance and, when this average molecular weight is less than 250, the density of crosslinking becomes too high to cause decrease of flexibility.

The average molecular weight of the molecular chain of the fluororesin (a) per one reactive group for crosslinking in the invention is a value defined by the following formula:

$$\frac{\text{molecular weight of the fluororesin}}{\text{number of the reactive group for crosslinking in the molecule}}$$

The value defined above can be calculated from a reactive group value for crosslinking (mgKOH/g), such as hydroxyl value, acid value and epoxy equivalent, of the fluororesin by the following equation:

$$\frac{56.1}{\text{reactive group value for crosslinking}} \times 10^3$$

The reactive group value for crosslinking can be measured by infrared spectroscopy, nuclear magnetic resonance spectroscopy and other suitable methods. The number 56.1 in the above equation is the molecular weight of potassium hydroxide.

When the reactive group for crosslinking is epoxy group, epoxy equivalent corresponds to the reactive group value for crosslinking.

Hydroxyl value of the fluororesin having hydroxyl group as the reactive group for crosslinking is preferably in the range from 1 to 200 mgKOH/g and more preferably in the range from 20 to 140 mgKOH/g.

When the hydroxyl value is less than 1 mgKOH/g, the crosslinking is insufficient to cause decrease of the properties and, when the hydroxyl value is more than 200 mgKOH/g, the density of crosslinking is too high to cause decrease of flexibility.

Acid value of the fluororesin having carboxyl group as the reactive group for crosslinking is preferably in the range from 1 to 200 mgKOH/g and more preferably in the range from 3 to 140 mgKOH/g.

When the acid value is less than 1 mgKOH/g, the crosslinking is insufficient to cause decrease of the properties and, when the acid value is more than 200 mgKOH/g, the density of crosslinking is too high to cause decrease of flexibility.

Epoxy equivalent of the fluororesin having epoxy group as the reactive group for crosslinking is preferably in the range from 100 to 15,000 g/eq and more preferably in the range from 300 to 14,000 g/eq.

When the epoxy equivalent is less than 100 g/eq, crosslinking is insufficient to cause decrease of the properties and, when the hydroxyl value is more than 15,000 g/eq, the density of crosslinking is too high to cause decrease of flexibility.

Other reactive groups for crosslinking in the fluororesin of the invention (a) are amide group, amino group, mercapto group, isocyanate group, active halogen such as bromine and iodine and the like others.

Glass transition temperature of the fluororesin (a) utilized in the invention is in the range from 35° to 120° C. and preferably in the range from 40° to 100° C. When the glass transition temperature is lower than 35° C., the fluororesin is not stable solid and cannot be utilized for the thermosetting powder coating material and, when the glass transition temperature is higher than 120° C., softening point is too high, to cause decrease of flow of the coating layer.

The fluororesin having reactive group for crosslinking (a) of the invention can be prepared according to conventional methods by polymerizing a mixture of monomers in a specified ratio by the action of a polymierization initiator in the presence or absence of a catalyst. Either solution polymerization, emulsion polymerization or suspension polymerization may be adopted.

When the fluororesin having reactive group for crosslinking (a) is prepared by the emulsion polymerization or the suspension polymerization, the dispersion medium is removed from the reaction mixture by vaporization under vacuum of 10 mmHg or lower at a temperature in the range from 50° to 100° C. and the residual mixture is pulverized by using a pulverizer, such as a Wiley pulverizer, a vibrating mill pulverizer, an impact hammer mill pulverizer and the like to obtain the fluororesin. When the fluororesin having reactive group for crosslinking (a) is prepared by the solution polymerization, the fluororesin is separated by removing the solvent by adding the reaction mixture into a solvent in which the fluororesin is insoluble and the separated fluororesin is dried and pulverized to obtain the fluororesin.

The fluororesin having reactive group for crosslinking (a) comprised in the thermosetting powder coating composition of the invention is utilized in solid form and it is preferred that the content of solvent remaining in the fluororesin which is measured by the decease of weight by heating is 2% or less. The term solvent includes the medium for suspension and is used in the same meaning in other parts of the description as well.

A large amount of solvent remaining in the fluororesin having reactive group for crosslinking is not desirable because storage stability of the powder coating material is deteriorated and damaged surfaces, such as bubbles, blisters and pin holes, are often found in the coating layer prepared by baking and curing of the powder coating material. It is more preferable that the content of solvent remaining measured by the decease of weight by heating in the fluororesin (a) is 1% or less.

In the thermosetting powder coating composition of the invention, it is preferred that 1 to 50 weight %, more preferably 1 to 30 weight %, of the fluororesin (a) is replaced with a resin for thermosetting powder coating material having the same kind of reactive group for crosslinking as the fluororesin.

Examples of the resin for thermosetting powder coating material are polyester resins and acrylic resins having either one, two or all of the hydroxyl value, the acid value and the epoxy equivalent.

The polyester resin having reactive group for crosslinking described above is a solid resin at the room temperature having two or more functional groups in the molecule in average and having the number average molecular weight in the range from 1000 to 20,000, preferably in the range from 1500 to 8000. When the functional group is hydroxyl group, the hydroxyl value is in the range from 10 to 300 mgKOH/g and preferably in the range from 10 to 200 mgKOH/g. When the functional group is carboxyl group, the acid value is in the range from 10 to 300 mgKOH/g and preferably in the range from 10 to 200 mgKOH/g.

The polyester resin can be prepared by direct esterification of a suitable carboxylic acid with a polyfunctional alcohol including ethyleneglycol. Commercial polyesters may be utilized.

Preferable examples of the suitable carboxylic acid described above are terephthalic acid, isophthalic acid, phthalic acid, succinic acid, glutaric acid, adipic acid, sebacic acid, β-oxypropionic acid, oxalic acid, maleic anhydride, trimellitic anhydride, pyromellitic acid and mixtures thereof. Preferably examples of the polyfunctional alcohol described above are ethyleneglycol, propanediol, butanediol, pentanediol, 1,6-hexanediol, neopentyl glycol, 2,2'-diethylpropanediol, cyclohexanediol, trimethylolpropane, pentaerythritol and mixtures thereof.

The acrylic resin having reactive group for crosslinking described above is a solid resin at the room temperature having two or more functional groups in the molecule in average and having the number average molecular weight in the range from 1000 to 20,000. When the functional group is hydroxyl group, the hydroxyl value is in the range from 10 to 300 mgKOH/g and preferably in the range from 10 to 200 mgKOH/g.

When the functional group is carboxyl group, the acid value is in the range from 10 to 300 mgKOH/g and preferably in the range from 10 to 200 mgKOH/g. When the functional group is epoxy group, the epoxy equivalent is in the range from 200 to 1500 g/eq.

The acrylic resin can be prepared by copolymerization of a copolymerizable vinyl monomer having hydroxyl group, carboxyl group, glycidyl group, amide group, amino group, mercapto group, isocyanate group or a halogen atom and other copolymerizable vinyl monomers.

Examples of the copolymerizable vinyl monomer having hydroxyl group are mono(meth)acrylic acid esters and monocrotonic acid esters of polyfunctional alcohols, allyl alcohol, monoallyl ethers of polyfunctional alcohols, hydroxyethyl vinyl ether and the like. Examples of the polyfunctional alcohol which can be utilized for forming the copolymerizable vinyl monomer having hydroxyl group are dihydric alcohols, such as ethylene glycol, polyethylene glycol, propylene glycol, polypropylene glycol, 1,3-butylene glycol, 1,4-butylene glycol, 1,6-hexanediol and the like, glycerine, trimethylolpropane, trimethylolethane, pentaerythritol and the like. Dihydroxyethyl fumarate, butyl hydroxyethyl fumarate and the like may also be utilized as the polyfunctional alcohol.

Examples of the copolymerizable vinyl monomer having carboxyl group are unsaturated acids having carboxyl group, such as acrylic acid, methacrylic acid, maleic acid, fumaric acid, itaconic acid and the like.

Examples of the copolymerizable vinyl monomer having epoxy group are glycidyl acrylate, glycidyl methacrylate, $\beta$-methylglycidyl acrylate, $\beta$-methylglycidyl methacrylate and the like.

Examples of the other copolymerizable vinyl monomer are alkyl acrylates, such as methyl acrylate, ethyl acrylate, butyl acrylate, 2-ethylhexyl acrylate and the like, alkyl methacrylates, such as methyl methacrylate, ethyl methacrylate, butyl methacrylate, 2-ethylhexyl methacrylate and the like, styrene and derivatives thereof, such as $\alpha$-methylstyrene and the like, vinyl acetate, vinyl propionate, acrylamide, methacrylamide, acrylonitrile, methacrylonitrile, vinyl stearate, acryl acetate, dialkyl fumarates, dialkyl itaconates, vinyl monomers containing halogen, vinyl monomers containing silicon, ethylene and the like. The other copolymerizable vinyl monomer described above may be utilized singly or as a mixture of two more kinds.

The acrylic resin having reactive group for crosslinking of the invention can be prepared by copolymerization of the monomers described above in the presence of a conventional polymerization initiator according to conventional methods, such as suspension polymerization and solution polymerization and the like. Commercial acrylic resins may also be utilized.

When the number average molecular weight of the acrylic resin having reactive group for crosslinking is lower than 1000, the coating layer prepared has insufficient mechanical strength such as impact resistance and flexibility and, when the number average molecular weight of the acrylic resin is higher than 20,000, the coating layer prepared is inferior in appearance such as smoothness and reflection of images.

When the reactive group in the polyester resin having reactive group for crosslinking or the acrylic resin having reactive group for crosslinking is a hydroxyl group, the hydroxyl value is preferably in the range from 10 to 300 mgKOH/g. When the hydroxyl value is less than 10 mgKOH/g, the crosslinking density is low and the properties of the coating layer is insufficient and, when the hydroxyl value is more than 300 mgKOH/g, the coating layer tends to become hard and fragile. When the reactive group in the polyester resin having reactive group for crosslinking or in the acrylic resin having reactive group for crosslinking is a carboxyl group, the acid value is preferably in the range from 10 to 300 mgKOH/g. When the acid value is less than 10 mgKOH/g, the crosslinking density is low and the properties of the coating layer is insufficient and, when the acid value is more than 300 mgKOH/g, the coating layer tends to become hard and fragile. When the reactive group in the polyester resin having reactive group for crosslinking or the acrylic resin having reactive group for crosslinking is an epoxy group, the epoxy equivalent is preferably in the range from 200 to 1500 g/eq. When the epoxy equivalent is less than 200 g/eq, the crosslinking density is low and the properties of the coating layer is insufficient and, when the epoxy equivalent is more than 1500 g/eq, the coating layer tends to become hard and fragile.

In the thermosetting powder coating composition of the invention, it is preferred that 1 to 50 weight %, more preferably 1 to 30 weight %, of the fluororesin (a) is replaced with a resin for thermoplastic powder coating material having the same kind of reactive group for crosslinking as the fluororesin (a).

Examples of the resin for thermoplastic powder coating material are acrylic resins, polyester resins, nylon resins, fluororesins and the like. It is preferable that the resin for thermoplastic powder coating material has a softening point in the range from 60° to 200° C. An example of commercial thermoplastic acrylic resin is Dianal BR-60 ® (a product of Mitsubishi Rayon Co., Ltd.). An example of commercial thermoplastic polyester resin is Bairon ® 560 (a product of Toyo Boseki Co., Ltd.). An example of commercial thermoplastic nylon resin is Orgasol ® 3502 (a product of Nippon Rilsan Co., Ltd.). An example of commercial thermoplastic fluororesin is Kainer 500 ® (a product of Pennwalt Chemicals Co.).

As the hardener (b) in the thermosetting powder coating composition of the invention, blocked isocyanate compounds are preferably utilized. Examples of such blocked isocyanate compound are compounds made by blocking the isocyanate group in a isocyanate compound, such as polyisocyanate compounds like isophorone diisocyanate, tolylene diisocyanate, xylylene diisocyanate, 4,4'-diphenylmethane diisocyanate, hexamethylene diisocyanate and the like, dimers and trimers thereof, polyisocyanate compounds made by modifying the above compounds with polyfunctional alcohols like trimethylolpropane, with a blocking agent, such as $\epsilon$-caprolactam, phenol, benzyl alcohol, methyl ethyl ketoxime and the like.

The blocked isocyanate compounds having solid form at the room temperature are favorably utilized.

Other examples of the hardener utilized in the invention are: aliphatic dibasic acids, such as fumaric acid, succinic acid, adipic acid, azelaic acid, sebacic acid, dodecane diacid and the like; acid anhydrides, such as phthalic anhydride, trimellitic anhydride, pyromerillitic anhydride and the like; polyester resins and acrylic resins having the acid value of 10 to 300 mgKOH/g, the glass transition temperature of 30° to 120° C. and the number average molecular weight of 1000 to 15000; dicyandiamide and derivatives thereof; imidazole and derivatives thereof; amine compounds, such as dibasic dihydrazide, diaminophenylmethane, cyclic amidine compounds and the like; melamine resins; glycidyl compounds, such as diglycidyl terephthalate, diglycidyl paraoxybenzoate, triglycidyl isocyanurate, spiroglycol diglycidyl ether, hidantoin compounds, alicyclic epoxy resins and the like; hydroxyl compounds, such as 1,4-bis-2'-hydroxyethoxybenzene, bishydroxyethyl terephthalate, styrene-allyl alcohol copolymers, spiroglycols, tris-2-hydroxyethyl isocyanurate, polyester resins and acrylic resins having hydroxyl value of 10 to 300 mgKOH/g, glass transition temperature of 30° to 120° C. and number average molecular weight of 1000 to 20000; and the like other compounds.

The thermosetting powder coating composition of the invention has the glass transition temperature preferably in the range from 35° to 120° C. and more preferably in the range from 40° to 100° C. When the glass transition temperature is lower than 35° C., the composition is not stable as a solid and sometimes unsuitable for utilizing as thermosetting powder coating composition.

When the glass transition temperature is higher than 120° C., the composition has too high softening point and flow of the coating layer is inferior.

Decrease of the weight of the thermosetting powder coating composition by heating is preferably 2% or less and more preferably 1% or less. The decrease of the weight of the composition of more than 2% is not desirable because the storage stability of the powder coating material is inferior and defects of the surface, such as bubbles, blisters and pin holes, are often found on the coating layer after the powder coating material has been baked and cured.

In the thermosetting powder coating composition of the invention, the amount of the fluororesin (a) is in the range from 60 to 97 weight % based on the total of the fluororesin (a) and the hardener (b) and the amount of the hardener (b) is in the range from 3 to 40 weight % based on the total of the fluororesin (a) and the hardener (b). The amount of the wax (c) is in the range from 0.01 to 10 weight parts based on 100 weight parts of the total of the fluororesin (a) and the hardener (b).

The relative amount of the fluororesin (a) and the hardener (b) can be suitably selected depending on the kind and the relative amount of the reactive group for crosslinking.

When the amount of the wax (c) is less than 0.01 weight %, the effect of the wax is not exhibited and, when the amount of the wax (c) is more than 10 weight %, appearance of the powder coating material is poor and the adhesive property to the substrate is deteriorated.

To the thermosetting powder coating composition of the invention, other ingredients which are generally added to coating compositions may be compounded additionally. Examples of such additional ingredients are modified resins; inorganic pigments, such as titanium dioxide, iron oxide red, iron oxide yellow, carbon black and the like; organic pigments, such as phthalocyanine green, phthalocyanine blue, quinacridone, isoindolinone and the like; fillers, such as talc, silica, calcium carbonate and the like; metal powders, such as aluminum powder, stainless steel powder and the like; mica powder; levelling agent; ultraviolet absorbent,; heat stabilizer; defoaming agent and the like. These additional ingredients may be added singly or as a combination of two or more kinds.

The composition of the invention can be prepared by mixing the components by the methods generally utilized for preparation of thermosetting powder coating compositions.

The thermosetting composition prepared by the method described above generally has a diameter of 400 μm or less. The composition is coated uniformly on a substrate, such as iron, aluminum, copper, zinc, alloys of these metals like stainless steel, brass and the like, with a commercial electrostatic powder coating apparatus, a commercial flow dipping apparatus or the like other apparatus, and then cured in a hot air oven, an infrared oven, a dielectric oven or the like apparatus, to form an excellent coating layer.

Thus, by utilizing 0.01 to 10 weight parts of the wax (c) based on 100 weight parts of the total of the fluororesin (a) and the hardener (b) in the thermosetting fluororesin powder coating composition, the thermosetting fluororesin powder coating composition having the excellent weatherability, acid resistance and adhesion to the substrate as well as the excellent water repellency and slipping property can be obtained.

DESCRIPTION OF THE PREFERRED EMBODIMENTS

The invention will be understood more readily with reference to the following examples; however, these examples are intended to illustrate the invention and are not to be construed to limit the scope of the invention.

Properties of the coating were evaluated by the following methods.

ACID RESISTANCE

On a test piece, 20% aqueous solution of sulfuric acid was dropped from a pipette for the spot test. Condition of the coating layer was evaluated by visual observation after 200 hours at 20° C.

Results of the evaluation were classified into the following grades; good: no change was observed poor: change of a large extent, such as blisters and loss of gloss, was observed.

WEATHERABILITY

Weatherability was evaluated according to the method of Japanese Industrial Standard K-5400 (1990) 9.8.1, accelerated weatherability of sun shine carbon 3-7 light method. Gloss retention and color change after 3000 hours of testing were evaluated according to the method of Japanese Industrial Standard D-0205 7.6.

Results of the evaluation were classified into the following grades;

good: no change was observed; retention of gloss, 85% or more and difference of color, less than 1.5.

poor: change of a large extent was observed; retention of gloss, less than 85% and/or difference of color, 1.5 or more.

ADHESIVE PROPERTY

Adhesive property was evaluated according to the lattice method of Japanese Industrial Standard K-5400 (1990) 8.5.1.

SLIPPING PROPERTY OF COATING LAYER

Static friction coefficient was measured by using the apparatus for measurement of static friction coefficient HEIDON-10 ® type (manufactured by Shinto Kagaku Co., Ltd.).

Results of the evaluation were classified into the following grades;

good: 0.15~0.19
poor: 0.20 or above.

WATER REPELLENCY OF COATING LAYER

Evaluated by measurement of the critical surface tension by the contact angle method.

Results of the evaluation were classified into the following grades;
good: 18~23
poor: 25 or above.

APPEARANCE

Appearance of the coating layer was evaluated by visual observation and results were classified into the following grades.
good: image of a fluorescent light on the coating layer was not deformed.
poor: image of a fluorescent light on the coating layer was deformed.

DECREASE OF WEIGHT BY HEATING

Decrease of weight by heating was measured according to the method of Japanese Industrial Standard K-5407 (1990) 5.

EXAMPLE OF PREPARATION OF MATERIAL 1

Into a stainless steel autoclave of 300 cc inner volume equipped with a stirrer, 157 weight parts of t-butanol, 16 weight parts of cyclohexyl vinyl ether, 9 weight parts of isobutyl vinyl ether, 25 weight parts of hydroxybutyl vinyl ether, 1 weight part of potassium carbonate and 0.07 weight parts of azo-bis-isobutyronitrile (AIBN) were charged and the air dissolved into the components and remaining in the system were removed by freezing with liquid nitrogen.

Then, 50 weight parts of chlorotrifluoroethylene was introduced and the temperature was gradually increased. The reaction was continued under stirring while the temperature was kept at 65° C. After 10 hours, the reaction vessel was cooled with water to stop the reaction. When the reaction mixture was cooled to the room temperature, unreacted monomer was discharged and the reaction vessel was opened.

The reaction system was then heated to 60° C. and the dispersion medium was removed under the vacuum of 1 mmHg in 24 hours. The reaction product was pulverized by an impact hammer mill to obtain a fluororesin having hydroxyl group (A-1) having the hydroxyl value of 120 mgKOH/g, the glass transition temperature of 45° C. and the decrease of weight by heating of 2% or less.

EXAMPLES OF PREPARATION OF MATERIAL 2 TO 5

Monomer mixtures shown in Table 1 were polymerized by the same method as in Example of preparation of material 1 and fluororesins having reactive group for crosslinking (A-2 to A-5) shown in Table 1 were obtained. The amounts of t-butanol and AIBN were suitably varied according to the condition of every case.

The hydroxyl values, the glass transition temperatures and the decrease of weight by heating of the fluororesins obtained were also listed in Table 1.

TABLE 1

| Example of preparation of material | 1 | 2 | 3 | 4 | 5 | 6 |
|---|---|---|---|---|---|---|
| composition of monomer (g) | | | | | | |
| chlorotrifluoroethylene | 50 | 51 | — | 48 | 54 | 53 |
| tetrafluoroethylene | — | — | 45 | — | — | — |
| cyclohexyl vinyl ether | 16 | 28 | 45 | 32 | 23 | 17 |
| ethyl vinyl ether | — | 10 | — | — | 13 | 10 |
| isobutyl vinyl ether | 9 | — | — | — | — | 9 |
| hydroxybutyl vinyl ether | 25 | 11 | 10 | 20 | 5 | 11 |
| vinyl acetate | — | — | — | — | 5 | — |
| total | 100 | 100 | 100 | 100 | 100 | 100 |
| property of polymer | | | | | | |
| fluorine content (weight %) | 24 | 25 | 30 | 22 | 30 | 30 |
| hydroxyl value (mgKOH/g) | 120 | 55 | 50 | 94 | 26 | 46 |
| acid value (mgKOH/g) | — | — | — | — | — | 5 |
| glass transition temperature (°C.) | 45 | 48 | 35 | 50 | 35 | 45 |
| decrease of weight by heating (%) | <2 | <2 | <2 | <2 | <2 | <2 |
| abbreviation for the prepared fluororesin having reactive group for crosslinking | A-1 | A-2 | A-3 | A-4 | A-5 | A-6 |
| average molecular weight between reactive groups for crosslinking of the resin | 468 | 1020 | 1122 | 597 | 2158 | 1100 |

EXAMPLE OF PREPARATION OF MATERIAL 6

The monomer mixture shown in Table 1 was polymerized by the same method as in Examples 1 to 5 and 100 weight parts of the polymer thus obtained was dissolved in 100 weight parts of xylene. In a four-necked flask equipped with a stirrer, 0.9 weight parts of succinic anhydride and 0.05 weight parts of triethyl benzyl ammonium chloride were added to the solution prepared above and the mixture was heated to 100° C. After heating for 3 hours under stirring, the reaction mixture was cooled. The mixture was heated again to 60° C. and the dispersion medium was removed under vacuum of 1 mmHg in 24 hours. The reaction product thus obtained was pulverized by an impact hammer mill to obtain a fluororesin having hydroxyl group and carboxyl group (A-6).

The hydroxyl value, the acid value, the glass transition temperature and the decrease of weight by heating are shown in Table 1.

EXAMPLE OF PREPARATION OF MATERIAL 7

Into a stainless steel autoclave of 300 cc inner volume equipped with a stirrer, 157 weight parts of t-butanol, 18 weight parts of cyclohexyl vinyl ether, 10 weight parts of isobutyl vinyl ether, 20 weight parts of glycidyl vinyl ether, 1 weight part of potassium carbonate and 0.07 weight parts of AIBN were charged and the air dissolved into the components and remaining in the system was removed by freezing with liquid nitrogen. Then, 52 weight parts of chlorotrifluoroethylene was introduced and the temperature was gradually increased. The reaction was continued under stirring while the temperature was kept at 65° C. After 10 hours, the reaction vessel was cooled with water to stop the reaction. When the reaction mixture was cooled to the room temperature, unreacted monomer was discharged and the reaction vessel was opened.

The reaction system was then heated to 60° C. and the dispersion medium was removed under the vacuum of 1 mmHg in 24 hours and the reaction product was pulverized by an impact hammer mill to obtain a fluororesin having glycidyl group (A-7) having the epoxy equivalent of 500 g/eq, the glass transition temperature of 49° C. and the decrease of weight by heating of 2% or less.

EXAMPLES OF PREPARATION OF MATERIAL 8-10

Monomer mixtures shown in Table 2 were polymerized by the same method as in Example of preparation of material 1 and fluororesins having glycidyl group (A-8 to A-10) shown in Table 2 were obtained. The amounts of t-butanol and AIBN were suitably varied according to the condition of every case.

The epoxy equivalents, the glass transition temperatures and the decrease of weight by heating of the fluororesins obtained were also listed in Table 2.

TABLE 2

| Example of preparation of material | 7 | 8 | 9 | 10 |
|---|---|---|---|---|
| composition of monomer (g) | | | | |
| chlorotrifluoroethylene | 52 | 55 | 48 | 30 |
| tetrafluoroethylene | — | — | — | 21 |
| cyclohexyl vinyl ether | 18 | 35 | 32 | 20 |
| ethyl vinyl ether | — | — | 15 | — |
| isobutyl vinyl ether | 10 | — | — | 14 |
| vinyl acetate | — | — | — | 13 |
| glycidyl vinyl ether | 20 | 10 | — | 2 |
| allyl glycidyl ether | — | — | 5 | — |
| total | 100 | 100 | 100 | 100 |
| property of polymer | | | | |
| fluorine content (weight %) | 29 | 31 | 27 | 33 |
| epoxy equivalent (g/eq) | 500 | 997 | 2180 | 10861 |
| glass transition temperature (°C.) | 49 | 55 | 51 | 37 |
| decrease of weight by heating (%) | <2 | <2 | <2 | <2 |
| abbreviation for the prepared fluororesin having reactive group for crosslinking | A-7 | A-8 | A-9 | A-10 |

EXAMPLE OF PREPARATION OF MATERIAL 11

A fluororesin copolymer comprising 52 weight parts of chlorotrifluoroethylene, 28 weight parts of cyclohexyl vinyl ether and 20 weight parts of hydroxybutyl vinyl ether was prepared by the same method as in Example of preparation of material 1 and 100 weight parts of the polymer thus obtained was dissolved in 100 weight parts of xylene. In a four-necked flask equipped with a stirrer, 3.6 weight parts of succinic anhydride and 0.05 weight parts of triethyl benzyl ammonium chloride were added to the solution prepared above and the mixture was heated to 100° C. After heating for 3 hours under stirring, the reaction mixture was cooled. The mixture was heated again to 60° C. and the dispersion medium was removed under vacuum of 1 mmHg in 24 hours. The reaction product thus obtained was pulverized by an impact hammer mill to obtain a fluororesin having hydroxyl group and carboxyl group (A-11).

The fluororesin (A-11) had the acid value of 19.5 mgKOH/g, the glass transition temperature of 47° C. and the decrease of weight by heating of 2% or less.

EXAMPLES OF PREPARATION OF MATERIAL 12 TO 14

Monomer mixtures shown in Table 3 were polymerized by the same method as in Example of preparation of material 11 and succinic anhydride was added to the reaction product to obtain fluororesins having carboxyl group. The amounts of t-butanol and AIBN were suitably varied according to the condition of every case.

The acid values, the glass transition temperatures and the decrease of weight by heating of the fluororesins obtained (A-12 to A-14) were also listed in Table 3.

TABLE 3

| Example of preparation of material | 11 | 12 | 13 | 14 |
|---|---|---|---|---|
| composition of monomer (g) | | | | |
| chlorotrifluoroethylene | 52 | 55 | 48 | 51 |
| cyclohexyl vinyl ether | 28 | 15 | — | — |
| ethyl vinyl ether | — | 10 | — | — |
| hydroxybutyl vinyl ether | 20 | — | 15 | 25 |
| isobutyl vinyl ether | — | 5 | 12 | 14 |
| isopropyl vinyl ether | — | 10 | 15 | — |
| vinyl acetate | — | 5 | 10 | — |
| total | 100 | 100 | 100 | 100 |
| modification succinic anhydride (g) | 3.6 | 1.8 | 0.9 | 5.0 |
| property of polymer | | | | |
| fluorine content (weight %) | 29 | 31 | 27 | 29 |
| acid value (mgKOH/g) | 19.5 | 10 | 5 | 26.7 |
| glass transition temperature (°C.) | 47 | 42 | 36 | 37 |
| decrease of weight by heating (%) | <2 | <2 | <2 | <2 |
| abbreviation for the prepared fluororesin having reactive group for crosslinking | A-11 | A-12 | A-13 | A-14 |
| average molecular wreight between reactive groups for crosslinking of the resin | 2877 | 5610 | 11220 | 2101 |

EXAMPLES 1 TO 17 AND COMPARATIVE EXAMPLES 1 TO 3

Components in Examples 1 to 17 and Comparative examples 1 and 2 shown in Table 4 were mixed homogeneously for about 1 minute with a dry blender (Henschel mixer ®, a product of Mitsui Kakoki Co., Ltd.) and then melt mixed at 80° to 100° C. with an extruder kneeder (Bussco kneeder PR46 ®, a product of Buss Co.). The product was cooled and pulverized with an impact hammer mill to fine powder and then screened by a 180 mesh screen to obtain powder coating materials of Examples 1 to 17 and Comparative examples 1 and 2. In Comparative example 3, Polyflon ® (polytetrafluoroethylene, a product of Daikin Kogyo Co., Ltd.) was utilized as the fluororesin.

The powder coating materials of Examples 1 to 17 and Comparative examples 1 to 3 thus prepared were coated with an electrostatic powder coating apparatus on soft steel plates treated with chromate treatment and zinc phosphate treatment to the thickness of 0.8 mm to form coating layers of thickness of 40 to 50 μm. The coated test pieces were baked at 190° C. for 20 minutes in Examples 1 to 4, in Examples 6 to 17 and in Comparative examples 1 and 2, at 250° C. for 5 minutes in Example 5 and at 380° C. for 20 minutes in Comparative example 3. Properties of the coating layers were evaluated by using the test pieces thus prepared according to the methods described above. Results of the evaluation are shown in Table 5.

TABLE 4

| Example | 1 | 2 | 3 | 4 | 5 | 6 | 7 | 8 | 9 | 10 |
|---|---|---|---|---|---|---|---|---|---|---|
| Comparative example | — | — | — | — | — | — | — | — | — | — |
| composition of coating material | | | | | | | | | | |
| fluororesin LF-710F[1] | 79.4 | 79.4 | 79.4 | 79.4 | 79.4 | 79.4 | 79.4 | 79.4 | 79.4 | 79.4 |
| A-1 | — | — | — | — | — | — | — | — | — | — |
| A-2 | — | — | — | — | — | — | — | — | — | — |
| A-3 | — | — | — | — | — | — | — | — | — | — |
| A-4 | — | — | — | — | — | — | — | — | — | — |
| A-5 | — | — | — | — | — | — | — | — | — | — |
| A-6 | — | — | — | — | — | — | — | — | — | — |
| Polyflon[2] | — | — | — | — | — | — | — | — | — | — |
| hardener adduct B-1530[3] | 20.6 | 20.6 | 20.6 | 20.6 | 20.6 | 20.6 | 50.6 | — | — | — |
| adduct B-1065[4] | — | — | — | — | — | — | — | 31.0 | 31.0 | 31.0 |
| adduct BF-1540[5] | — | — | — | — | — | — | — | — | — | — |
| Powderlink 1174[6] | — | — | — | — | — | — | — | — | — | — |
| pigment Tipure R-960[7] | 45.0 | 45.0 | 45.0 | 45.0 | 45.0 | 45.0 | 45.0 | 45.0 | 45.0 | 45.0 |
| wax Ceridast 3620[8] | 0.01 | 0.1 | 5.0 | 10.0 | — | — | — | — | — | — |
| Rancowax PE1500F[9] | — | — | — | — | 1.0 | 5.0 | 10.0 | — | — | — |
| Viscol 330P[10] | — | — | — | — | — | — | — | — | — | — |

| Example | 11 | 12 | 13 | 14 | 15 | 16 | 17 | — | — | — |
|---|---|---|---|---|---|---|---|---|---|---|
| Comparative example | — | — | — | — | — | — | — | 1 | 2 | 3 |
| composition of coating material | | | | | | | | | | |
| fluororesin LF-710F[1] | — | — | — | — | — | — | — | 79.4 | 79.4 | — |
| A-1 | 62.6 | — | — | — | — | — | — | — | — | — |
| A-2 | — | 78.4 | — | — | — | — | — | — | — | — |
| A-3 | — | — | 80.0 | — | — | — | — | — | — | — |
| A-4 | — | — | — | 68.1 | — | — | — | — | — | — |
| A-5 | — | — | — | — | 88.5 | — | 95.2 | — | — | — |
| A-6 | — | — | — | — | — | 81.3 | — | — | — | — |
| Polyflon[2] | — | — | — | — | — | — | — | — | — | 100.0 |
| hardener adduct B-1530[3] | 37.4 | 21.6 | 20.0 | 31.9 | 11.5 | — | — | 20.6 | 20.6 | — |
| adduct B-1065[4] | — | — | — | — | — | — | — | — | — | — |
| adduct BF-1540[5] | — | — | — | — | — | 18.7 | — | — | — | — |
| Powderlink 1174[6] | — | — | — | — | — | — | 4.8 | — | — | — |
| pigment Tipure R-960[7] | 45.0 | 45.0 | 45.0 | 45.0 | 45.0 | 45.0 | 45.0 | 45.0 | 45.0 | — |
| wax Ceridast 3620[8] | 0.01 | 5.0 | 10.0 | — | 1.0 | — | — | — | 15.0 | — |
| Rancowax PE1500F[9] | — | — | — | — | 1.0 | 5.0 | 10.0 | — | — | — |
| Viscol 330P[10] | — | — | — | 5.0 | — | — | — | — | — | — |

[1]LF-710F ®: a product os Asahi Glass Co., Ltd.; hydroxyl value, 50 mgKOH/g; glass transition temperature, 68° C.; fluorine content, 30%.
[2]Polyflon ®: a product of Daikin Kogyo Co., Ltd; polytetrafluoroethylene, a thermoplastic fluororesin.
[3]Adduct B-1530 ®: a product of Hüls Co.; an ε-caprolactam blocked isophorone diisocyanate; NCO equivalent, 280 g/eq.
[4]Adduct B-1065 ®: a product of Hüls Co.; an ε-caprolactam blocked isophorone diisocyanate; NCO equivalent, 400 g/eq.
[5]Adduct BF-1540 ®: a product of Hüls Co.; an urethodione compound; solid content, 100%; NCO equivalent, 280 g/eq.
[6]Powderlink 1174 ®: a product of Cyanamid Co.; an amino resin hardener; average molecular weight, 350; functional group equivalent, 90–125 g/eq.
[7]Tipure R-960 ®: a product of Du Pont Co.; titanium dioxide.
[8]Ceridast 3620 ®: a product of Höchst Co.; a polyethylene wax; melting point, 125° C.
[9]Rancowax PE1500F ®: a product of Rangar Co.; a polyethylene wax; melting point 140° C.
[10]Viscol 330-P ®: a product of Sanyo Kasei Co., Ltd.; a polypropylene wax; melting point, 152° C.

TABLE 5

| Example | 1 | 2 | 3 | 4 | 5 | 6 | 7 | 8 | 9 | 10 |
|---|---|---|---|---|---|---|---|---|---|---|
| Comparative example | — | — | — | — | — | — | — | — | — | — |
| Evaluation | | | | | | | | | | |
| acid resistance | good | good | good | good | good | good | good | good | good | good |
| weatherability | good | good | good | good | good | good | good | good | good | good |
| adhesive property (number/100) | 100 | 100 | 100 | 100 | 100 | 100 | 100 | 100 | 100 | 100 |
| smoothness | good | good | good | good | good | good | good | good | good | good |
| slipping property | 0.18 | 0.17 | 0.17 | 0.15 | 0.18 | 0.17 | 0.17 | 0.18 | 0.16 | 0.15 |
| water repellency | 22.2 | 21.0 | 19.6 | 19.2 | 21.7 | 20.4 | 19.7 | 22.0 | 20.2 | 19.5 |

| Example | 11 | 12 | 13 | 14 | 15 | 16 | 17 | — | — | — |
|---|---|---|---|---|---|---|---|---|---|---|
| Comparative example | — | — | — | — | — | — | — | 1 | 2 | 3 |
| Evaluation | | | | | | | | | | |
| acid resistance | good | good | good | good | good | good | good | good | good | good |
| weatherability | good | good | good | good | good | good | good | good | good | good |
| adhesive property (number/100) | 100 | 100 | 100 | 100 | 100 | 100 | 100 | 100 | 60 | 0 |
| smoothness | good | good | good | good | good | good | good | good | good | good |
| slipping property | 0.19 | 0.18 | 0.18 | 0.17 | 0.18 | 0.19 | 0.17 | 0.25 | 0.15 | 0.15 |
| water repellency | 22.2 | 21.1 | 19.8 | 19.0 | 21.5 | 21.4 | 19.7 | 34.5 | 19.3 | 18.8 |

EXAMPLES 18 TO 31 AND COMPARATIVE EXAMPLES 4 TO 7

In Examples 18 to 23, thermosetting powder coating compositions which comprise a fluororesin having glycidyl group (a) and a hardener having carboxyl group (b) and, in Examples 24 to 31, thermosetting powder coating compositions which comprise a fluororesin having carboxyl group (a) and a hardener having glycidyl group (b) are described.

Components in Examples 18 to 31 and Comparative examples 4 to 7 shown in Table 6 were mixed homogeneously for about 1 minute with a dry blender (Henshel mixer®, a product of Mitsui Kakoki Co., Ltd.) and then melt mixed at 80° to 120° C. with an extruder kneeder (Bussco kneeder PR46®, a product of Buss Co.). The product was cooled and pulverized with an impact hammer mill to fine powder and then screened by a 180 mesh screen to obtain powder coating materials of Examples 18 to 31 and Comparative examples 4 to 7.

The powder coating materials of Examples 18 to 31 and Comparative examples 4 to 7 thus prepared as shown in Table 6 were coated with an electrostatic powder coating apparatus on soft steel plates treated with chromate treatment and zinc phosphate treatment to the thickness of 0.8 mm to form coating layers of thickness of 40 to 50 µm. The coated pieces were baked at 190° C. for 20 minutes to obtain test pieces. Properties of the coating layer were evaluated by using the test pieces thus prepared according to the methods described above. Results of the evaluation are shown in Table 7.

TABLE 6

| Example | | 18 | 19 | 20 | 21 | 22 | 23 | 24 |
|---|---|---|---|---|---|---|---|---|
| composition of coating material | | | | | | | | |
| fluororesin | A-7 | 95.7 | — | 92.0 | — | — | — | — |
| | A-8 | — | 79.4 | — | 93.9 | — | — | — |
| | A-9 | — | — | — | — | 89.1 | — | — |
| | A-10 | — | — | — | — | — | 96.9 | — |
| | A-11 | — | — | — | — | — | — | — |
| | A-12 | — | — | — | — | — | — | — |
| | A-13 | — | — | — | — | — | — | — |
| | A-14 | — | — | — | — | — | — | 82.0 |
| hardener | dodecane diacid | — | — | — | — | — | 3.1 | — |
| | trimellitic anhydride | — | — | — | 6.1 | — | — | — |
| | Finedic M-8540[1] | — | — | — | — | 10.9 | — | — |
| | Johncry 680[2] | — | 20.6 | — | — | — | — | — |
| | dicyandiamide | 4.1 | — | — | — | — | — | — |
| | adipic acid dihydrazide | — | — | 8.0 | — | — | — | — |
| | Almatex PD 6730[3] | — | — | — | — | — | — | 18.0 |
| | diglycidyl terephthalate | — | — | — | — | — | — | — |
| | trigylcidyl terephthalate | — | — | — | — | — | — | — |
| | PRIMID XL-552[4] | — | — | — | — | — | — | — |
| pigment | Taipure R-960[5] | 45.0 | 45.0 | 45.0 | 45.0 | 45.0 | 45.0 | 45.0 |
| wax | Ceridast 3620[6] | 0.01 | 0.1 | 0.1 | 5.0 | 10.0 | 1.0 | 1.0 |
| | Ranco wax PE1500F[7] | — | — | — | — | — | 1.0 | — |
| | Viscol 330P[8] | — | — | — | — | — | — | — |
| | MPP-230F[9] | — | — | — | — | — | — | — |

| Example | | 25 | 26 | 27 | 28 | 29 | 30 | 31 |
|---|---|---|---|---|---|---|---|---|
| composition of coating material | | | | | | | | |
| fluororesin | A-7 | — | — | — | — | — | — | — |
| | A-8 | — | — | — | — | — | — | — |
| | A-9 | — | — | — | — | — | — | — |
| | A-10 | — | — | — | — | — | — | — |
| | A-11 | 95.8 | — | — | — | — | — | — |
| | A-12 | — | 96.4 | — | — | — | — | — |
| | A-13 | — | — | 96.9 | — | — | — | — |
| | A-14 | — | — | — | 94.3 | 94.3 | 94.3 | 95.7 |
| hardener | dodecane diacid | — | — | — | — | — | — | — |
| | trimellitic anhydride | — | — | — | — | — | — | — |
| | Finedic M-8540[1] | — | — | — | — | — | — | — |
| | Johncry 680[2] | — | — | — | — | — | — | — |
| | dicyandiamide | 4.1 | — | — | — | — | — | — |
| | adipic acid dihydrazide | — | — | — | — | — | — | — |
| | Almatex PD 6730[3] | — | — | — | — | — | — | — |
| | diglycidyl terephthalate | — | 3.6 | 3.1 | — | — | — | — |
| | trigylcidyl terephthalate | 4.2 | — | — | 5.7 | 5.7 | 5.7 | — |
| | PRIMID XL-552[4] | — | — | — | — | — | — | 4.3 |
| pigment | Taipure R-960[5] | 45.0 | — | 45.0 | 45.0 | 45.0 | 45.0 | 45.0 |
| wax | Ceridast 3620[6] | — | — | — | — | — | — | — |
| | Ranco wax PE1500F[7] | 5.0 | 10.0 | — | — | — | — | 10.0 |
| | Viscol 330P[8] | — | — | 1.0 | 5.0 | 10.0 | — | — |
| | MPP-230F[9] | — | — | — | — | — | 1.0 | — |
| Comparative example | | | | | 4 | 5 | 6 | 7 |
| composition of coating material | | | | | | | | |

TABLE 6-continued

| | | | | | |
|---|---|---|---|---|---|
| fluororesin | A-7 | 95.9 | — | — | — |
| | A-8 | — | — | — | — |
| | A-9 | — | 89.1 | — | — |
| | A-10 | — | — | — | — |
| | A-11 | — | — | — | — |
| | A-12 | — | — | 96.4 | — |
| | A-13 | — | — | — | — |
| | A-14 | — | — | — | 94.3 |
| hardener | dodecane diacid | — | — | — | — |
| | trimellitic anhydride | — | — | — | — |
| | Finedic M-8540[1] | — | 10.9 | — | — |
| | Johncryl 680[2] | — | — | — | — |
| | dicyandiamide | 4.1 | — | — | — |
| | adipic acid dihydrazide | — | — | — | — |
| | Almatex PD 6730[3] | — | — | — | — |
| | diglycidyl terephthalate | — | — | 3.6 | — |
| | triglycidyl terephthalate PRIMID XL-552[4] | — | — | — | 5.7 |
| pigment | Taipure R-960[5] | 45.0 | — | 45.0 | 45.0 |
| wax | Ceridast 3620[6] | — | — | — | — |
| | Ranco wax PE1500F[7] | — | — | 20 | — |
| | Viscol 330P[8] | — | — | — | — |
| | MPP-230F[9] | — | — | — | — |

[1]Finedic M-8540 ®: a product of Dainippon Ink Kagaku Kogyo C., Ltd.; a polyester resin; acid value, 220 mgKOH/g; number average molecular weight, 1900.
[2]Johncryl 680 ®: a product of Johnson Wax Co.; an acrylic resin; acid value, 215 mgKOH/g; number average molecular weight, 1800.
[3]Almatex PD-6730 ®: a product of Mitsui Toatsu Co., Ltd.; an acrylic resin; epoxy equivalent, 460 g/eq; number average molecular weight, 3300.
[4]PRIMID XL-552 ®: a product of the Rohm and Haas Co.; a β-hydroxyalkyl amide.
[5]Tipure R-960 ®: a product of Du Pont Co.; titanium dioxide.
[6]Ceridast 3620 ®: a product of Höchst Co.; a polyethylene wax; melting point 125° C.
[7]Rancowax PE1500F ®: a product of Rangar Co.; a polyethylene wax; melting point 140° C.
[8]Viscol 330-P ®: a product of Sanyo Kasei Co., Ltd.; a polypropylene wax; melting point, 152° C.
[9]MPP-230F ®: a product of Micro Powder Co.; a polyethylene wax; melting point, 245° C.

TABLE 7

| Example | 18 | 19 | 20 | 21 | 22 | 23 | 24 | 25 | 26 |
|---|---|---|---|---|---|---|---|---|---|
| Comparative example | — | — | — | — | — | — | — | — | — |
| Evaluation | | | | | | | | | |
| acid resistance | good | good | good | good | good | good | good | good | good |
| weatherability | good | good | good | good | good | good | good | good | good |
| adhesive property (number/100) | 100 | 100 | 100 | 100 | 100 | 100 | 100 | 100 | 100 |
| smoothness | good | good | good | good | good | good | good | good | good |
| slipping property | 0.19 | 0.18 | 0.19 | 0.18 | 0.19 | 0.18 | 0.17 | 0.18 | 0.17 |
| water repellency | 22.4 | 22.2 | 22.0 | 20.6 | 19.2 | 21.7 | 20.7 | 20.5 | 18.7 |

| Example | 27 | 28 | 29 | 30 | 31 | — | — | — | — |
|---|---|---|---|---|---|---|---|---|---|
| Comparative example | — | — | — | — | — | 4 | 5 | 6 | 7 |
| Evaluation | | | | | | | | | |
| acid resistance | good | good | good | good | good | good | good | good | good |
| weatherability | good | good | good | good | good | good | good | poor | good |
| adhesive property (number/100) | 100 | 100 | 100 | 100 | 100 | 100 | 100 | 25 | 100 |
| smoothness | good | good | good | good | good | good | good | good | poor |
| slipping property | 0.18 | 0.18 | 0.17 | 0.19 | 0.17 | 0.26 | 0.28 | 0.17 | 0.24 |
| water repellency | 21.8 | 19.8 | 19.7 | 20.3 | 19.7 | 34.5 | 35.4 | 19.6 | 34.1 |

EXAMPLES 32 to 41

In Examples 32 to 36, 1 to 50 weight % of the fluororesin (a) in the thermosetting powder coating compositions were replaced with other resins for thermosetting powder coating material having the same kind of reactive group for crosslinking as the fluororesin (a). In Examples 37 to 41, 1 to 50 weight % of the fluororesins (a) in the thermosetting powder coating compositions were replaced with other resins for thermoplastic powder coating material having the same kind of reactive group for crosslinking as the fluororesin.

Components in Examples 32 to 41 shown in Table 8 were mixed homogeneously for about 1 minute with a dry blender (Henshel mixer ®, a product of Mitsui Kakoki Co., Ltd.) and then melt mixed at 80° to 120° C. with an extruder kneader (Bussco kneeder PR46 ®, a product of Buss Co.). The product was cooled and pulverized with an impact hammer mill to fine powder and then screened by a 180 mesh screen to obtain powder coating materials of Examples 32 to 41.

The powder coating materials of Examples 32 to 41 thus prepared as shown in Table 8 were coated with an electrostatic powder coating apparatus on steel plates treated with chromate treatment and zinc phosphate treatment to the thickness of 0.8 mm to form coating layers of thickness of 40 to 50 μm. The coated pieces were baked at 190° C. for 20 minutes to obtain test pieces. Properties of the coating layers were evaluated by using the test pieces thus prepared according to the methods described above. Results of the evaluation are shown in Table 9.

TABLE 8

| Example | 32 | 33 | 34 | 35 | 36 | 37 |
|---|---|---|---|---|---|---|
| Comparative example | — | — | — | — | — | — |
| composition of coating material | | | | | | |
| fluororesin | | | | | | |
| LF-710F[1] | 50.0 | 60.0 | — | — | — | — |
| A-7 | — | — | 90.0 | — | — | — |
| A-10 | — | — | — | — | — | — |
| A-11 | — | — | — | 80.0 | — | — |
| A-14 | — | — | — | — | 90.0 | — |
| thermosetting coating resin | | | | | | |
| Almatex AP-3304[2] | 29.0 | — | — | — | — | — |
| Finedek A-207S[3] | — | — | 5.9 | — | — | — |
| Almatex AP3299[4] | — | — | — | 15.8 | — | — |
| Ester Resin ER6650[5] | — | 19.4 | — | — | — | — |
| Uralak P-3500[6] | — | — | — | — | 4.3 | — |
| thermoplastic coating resin | | | | | | |
| Dianal BR-60[7] | — | — | — | — | — | 10.0 |
| Bairon 560[8] | — | — | — | — | — | — |
| Orgasol 3502[9] | — | — | — | — | — | — |
| Kainer 500[10] | — | — | — | — | — | — |
| hardener | | | | | | |
| Adduct B-1530[11] | 20.6 | 20.6 | — | — | — | 20.6 |
| dicyandiamide | — | — | 4.1 | — | — | — |
| dodecane diacid | — | — | — | — | — | — |
| triglycidyl terephthalate | — | — | — | 4.2 | 5.7 | — |
| pigment Taipure R-960[12] | 20.0 | 20.0 | 20.0 | 20.0 | 20.0 | 20.0 |
| wax | | | | | | |
| Ceridast 3620[13] | 0.5 | 0.5 | 0.5 | — | — | — |
| Ranco wax PE1500F[14] | — | — | — | 0.5 | 0.5 | 0.5 |
| Viscol 330P[15] | — | — | — | — | — | — |

| Example | 38 | 39 | 40 | 41 | — | — |
|---|---|---|---|---|---|---|
| Comparative example | — | — | — | — | 8 | 9 |
| composition of coating material | | | | | | |
| fluororesin | | | | | | |
| LF-710F[1] | 74.4 | — | — | — | — | — |
| A-7 | — | — | 90.0 | — | 44.1 | — |
| A-10 | — | 81.9 | — | — | — | 46.9 |
| A-11 | — | — | 90.8 | 75.8 | — | — |
| A-14 | — | — | — | — | — | — |
| thermosetting coating resin | | | | | | |
| Almatex AP-3304[2] | — | — | — | — | — | — |
| Finedek A-207S[3] | — | — | — | — | 51.8 | — |
| Almatex AP3299[4] | — | — | — | — | — | — |
| Ester Resin ER6650[5] | — | — | — | — | — | — |
| Uralak P-3500[6] | — | — | — | — | — | — |
| thermoplastic coating resin | | | | | | |
| Dianal BR-60[7] | — | — | — | — | — | 50.0 |
| Bairon 560[8] | 5.0 | — | — | — | — | — |
| Orgasol 3502[9] | — | 15.0 | — | — | — | — |
| Kainer 500[10] | — | — | 5.0 | 20.0 | — | — |
| hardener | | | | | | |
| Adduct B-1530[11] | — | — | — | — | 4.1 | — |
| dicyandiamide | — | — | — | — | — | — |
| dodecane diacid | — | 3.1 | — | — | — | 3.1 |
| triglycidyl terephthalate | — | — | 4.2 | 4.2 | — | — |
| pigment Taipure R-960[12] | 20.0 | 20.0 | 20.0 | 20.0 | 20.0 | 20.0 |
| wax | | | | | | |
| Ceridast 3620[13] | — | — | — | — | — | — |
| Ranco wax PE1500F[14] | — | — | — | — | — | — |

TABLE 4-continued

| Viscol 330P[15] | 0.5 | 0.5 | 0.5 | 0.5 | 0.5 | 0.5 |
|---|---|---|---|---|---|---|

[1] LF-710F ®: a product os Asahi Glass Co., Ltd.; hydroxyl value, 50 mgKOH/g; glass transition temperature, 68° C.; fluorine content, 30%.
[2] Almatex AP-3304 ®: a product of Mitsui Toatsu Co., Ltd.; an acrylic resin; hydroxyl value, 50 mgKOH/g; number average molecular weight, 3000.
[3] Finedic A-2078 ®: a product of Dainippon Ink Kagaku Kogyo Co., Ltd.; an acrylic resin; epoxy equivalent, 508 g/eq; number average molecular weight, 3500.
[4] Almatex AP-3299 ®: a product of Mitsui Toatsu Co., Ltd.; acid value, 33 mgKOH/g; number average molecular weight 3300.
[5] Ester Resin ER-6650 ®: a product of Nippon Ester Co., Ltd.; a polyester resin; hydroxyl value, 30 mgKOH/g; number average molecular weight, 4100.
[6] Uralack P-3500 ®: a product of Yubika DSM Resins Co., Ltd.; a polyester resin; acid value, 33~38 mgKOH/g; number average molecular weight, 2900.
[7] Dianal BR-60 ®: a product of Mitsubishi Rayon Co., Ltd.; a thermoplastic acrylic resin; softening point, 100 to 140° C.
[8] Bairon 560 ®: a product of Toyo Boseki Co., Ltd.; a thermoplastic polyester resin; softening point, 110° Co.
[9] Orgasol 3502 ®: a product of Nippon Rilsan Co., Ltd.; a nylon powder; softening point 135~160° C.
[10] Kainer 500 ®: a product of Pennsalt Chemicals Co.; polyvinylidene fluoride; softening point, 160~170° C.
[11] Adduct B-1530 ®: a product of Hüls Co.; an ε-caprolactam blocked isophorone diisocyanate; NCO equivalent, 280 g/eq.
[12] Tipure R-960 ®: a product of Du Pont Co.; titanium dioxide.
[13] Ceridast 3620 ®: a product of Höchst Co.; a polyethylene wax; melting point, 125° C.
[14] Rancowax PE1500F ®: a product of Rangar Co.; a polyethylene wax; melting point 140° C.
[15] Viscol 330-P ®: a product of Sanyo Kasei Co., Ltd.; a polypropylene wax; melting point, 152° C.
[2] Johncryl 680 ®: a product of Johnson Wax Co.; an acrylic resin; acid value, 215 mgKOH/g; number average molecular weight, 1800.

TABLE 9

| Example | 32 | 33 | 34 | 35 | 36 | 37 |
|---|---|---|---|---|---|---|
| Comparative example | — | — | — | — | — | — |
| Evaluation | | | | | | |
| acid resistance | good | good | good | good | good | good |
| weatherability | good | good | good | good | good | good |
| adhesive property (number/100) | 100 | 100 | 100 | 100 | 100 | 100 |
| smoothness | good | good | good | good | good | good |
| slipping property | 0.19 | 0.19 | 0.18 | 0.18 | 0.18 | 0.19 |
| water repellency | 21.2 | 22.2 | 19.6 | 20.2 | 19.7 | 19.4 |

| Example | 38 | 39 | 40 | 41 | — | — |
|---|---|---|---|---|---|---|
| Comparative example | — | — | — | — | 8 | 9 |
| Evaluation | | | | | | |
| acid resistance | good | good | good | good | good | good |
| weatherability | good | good | good | good | poor | poor |
| adhesive property (number/100) | 100 | 100 | 100 | 100 | 50 | 80 |
| smoothness | good | good | good | good | good | poor |
| slipping property | 0.19 | 0.18 | 0.17 | 0.16 | 0.19 | 0.19 |
| water repellency | 19.7 | 19.7 | 18.5 | 18.2 | 22.4 | 22.9 |

As the results in Tables 5, 7 and 9 show, the thermosetting fluororesin powder coating compositions of Examples 1 to 41 had the same degree of the water repellency and the slipping property as polytetrafluoroethylene and the static friction coefficient and the critical surface tension decreased while the weatherability, the acid resistance and the adhesive property were retained.

The thermosetting powder coating material of Comparative examples 1, 4, 5 and 7 which did not comprise wax had inferior slipping property and water repellency.

The thermosetting powder coating material of Comparative example 2 which comprised more than 10 weight parts of wax had inferior adhesive property and smoothness. The thermosetting powder coating material of Comparative example 6 had inferior adhesive property and weatherability.

The thermosetting powder coating materials of Comparative example 3 which comprised polytetrafluoroethylene resin had inferior adhesive property.

The thermosetting powder coating material of Comparative example 8 which comprised more than 50 weight % of thermosetting powder coating resin having reactive group for crosslinking had inferior adhesive property and weatherability.

The thermosetting powder coating material of Comparative example 9 which comprised more than 50 weight % of thermoplastic powder coating resin had inferior weatherability, adhesive property and smoothness.

While the invention has been particularly shown and described with reference to preferred embodiments thereof, it will be understood by those skilled in the art that the foregoing and other changes in form and details can be made therein without departing from the spirit and scope of the invention.

To summarize the advantages obtained by the invention, the coating layer formed from the thermosetting fluororesin powder coating composition has the same degree of water repellency and slipping property to those of the coating layer formed from polytetrafluoroethylene powder which is a thermoplastic fluororesin powder while the excellent weatherability, acid resistance and adhesion to substrates are retained.

What is claimed is:

1. A thermosetting powder coating composition comprising (a) a fluororesin having reactive group for crosslinking in the molecule which contains 10 weight % or more of fluorine and has glass transition temperature in the range from 35° to 120° C., (b) a hardener which can form crosslinking by reaction with the reactive group for crosslinking in the fluororesin (a) and (c) a synthetic wax or a natural wax, the amount of the fluororesin being in the range from 60 to 97 weight % based on the total of the fluororesin and the hardener, the amount of the hardener being in the range from 3 to 40 weight % based on the total of the fluororesin and the hardener and the amount of the synthetic wax or the natural wax being in the range from 0.01 to 10 weight parts based on 100 weight parts of the total of the fluororesin and the hardener.

2. A thermosetting powder coating composition as claimed in claim 1 wherein decrease of weight by heating of the fluororesin (a) is 2% or less.

3. A thermosetting powder coating composition as claimed in claim 1 wherein decrease of weight by heating of the fluororesin (a) is 1% or less.

4. A thermosetting powder coating composition as claimed in claim 1 wherein the synthetic or the natural wax (c) is unsubstituted polyolefin wax, polyamide wax, fluorinated polyolefin wax, fatty acid ester wax or beeswax.

5. A thermosetting powder coating composition as claimed in claim 1 wherein the synthetic wax or the natural wax (c) is unsubstituted polyolefin wax.

6. A thermosetting powder coating composition as claimed in claim 1 wherein the fluororesin (a) has a hydroxyl value in the range from 20 to 140 mgKOH/g.

7. A thermosetting powder coating composition as claimed in claim 1 wherein the fluororesin (a) has a acid value in the range from 3 to 140 mgKOH/g.

8. A thermosetting powder coating composition as claimed in claim 1 wherein the fluororesin (a) has an epoxy equivalent in the range from 300 to 14,000 g/eq.

9. A thermosetting powder coating composition as claimed in claim 1 wherein the synthetic wax or the natural wax (c) has a melting point in the range from 50° to 280° C.

10. A thermosetting powder coating composition as claimed in claim 1 wherein 1 to 50 weight % of the fluororesin (a) is replaced with a resin for thermosetting powder coating material having the same reactive group for crosslinking as the fluororesin (a).

11. A thermosetting powder coating composition as claimed in claim 1 wherein 1 to 30 weight % of the fluororesin (a) is replaced with a resin for thermosetting powder coating material having the same reactive group for crosslinking as the fluororesin (a).

12. A thermosetting powder coating composition as claimed in claim 10 wherein the resin for thermoplastic coating material is an acrylic resin, a polyester resin or a nylon resin.

13. A thermosetting powder coating composition as claimed in claim 1 wherein the reactive group for crosslinking in the fluororesin (a) is hydroxyl group, carboxyl group or glycidyl group.

14. A thermosetting powder coating composition as claimed in claim 1 wherein the fluororesin (a) contains from 10 to 72 weight % of fluorine.

* * * * *